Oct. 25, 1949.  J. M. AXFORD ET AL  2,486,096

COVER FOR AUTOMOBILE VISORS

Filed Aug. 13, 1947

INVENTOR.
Joseph M. Axford
Mary S. Axford
BY Victor J. Evans & Co.

ATTORNEYS

Patented Oct. 25, 1949

2,486,096

UNITED STATES PATENT OFFICE 2,486,096

COVER FOR AUTOMOBILE VISORS

Joseph M. Axford and Mary S. Axford,
Troutdale, Oreg.

Application August 13, 1947, Serial No. 768,332

3 Claims. (Cl. 224—29)

This invention relates to a cover which is adapted to be mounted on a sun visor of an automobile.

An object of the invention is to provide a cover for a sun visor having pockets therein wherein colored glasses, matches, pencils and other necessary articles may be carried within easy reach of the driver of the automobile in which the visor is mounted.

The placing of these articles in convenient, easy reach of the driver will prevent some of the accidents probably caused now-a-days by the driver fishing in his pocket or the glove compartment on the seat beside him, for cigarettes, matches, sunglasses or other articles which he habitually carries with him while driving.

The device can be inexpensively made, and being removable, can be easily taken off of the sun visor for replacement thereof, when worn, or for necessary laundry, should it become dirty.

With the above and other objects and advantages in view, the invention consists of the novel details of construction, arrangement and combination of parts more fully hereinafter described, claimed and illustrated in the accompanying drawing in which:

Figure 1:
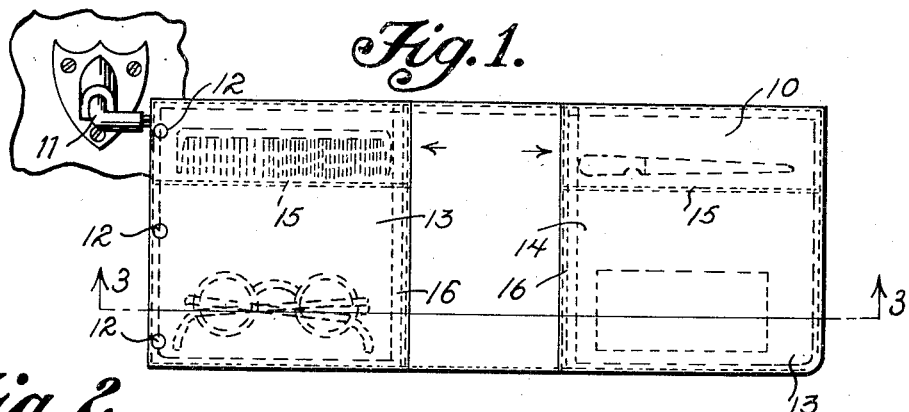
Figure 1 is a front elevational view of an embodiment of the invention as mounted on the sun visor of an automobile.
Figure 2:
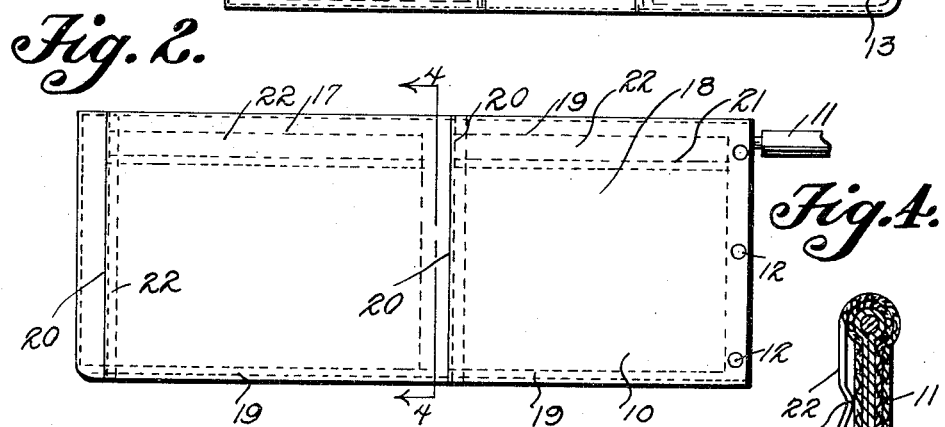
Figure 2 is a rear elevational view of the embodiment of the invention.
Figure 4:
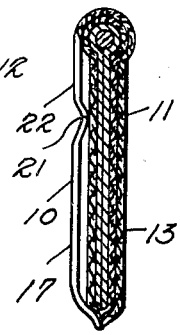
Figure 4 is a sectional view on the line 4—4 of Figure 2.
Figure 3:
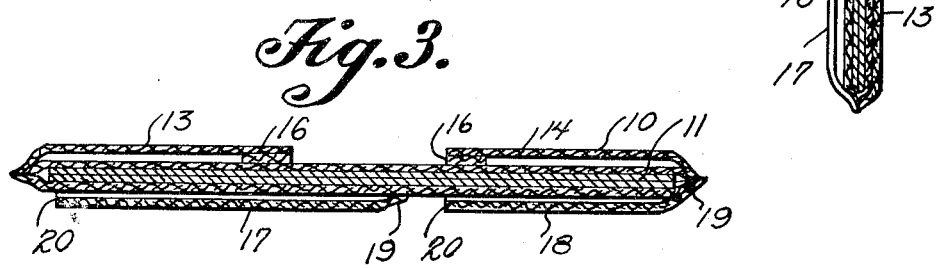
Figure 3 is a sectional view on the line 3—3 of Figure 1.

Referring more in detail to the drawings, the invention embodies a cover or envelope 10 which is of a size to be conveniently positioned on a sun visor 11 of an automobile.

The cover, which is rectangular-shaped is closed at bothsides and one end, but the opposite end is open and provided with snap fasteners 12 which, when open, permit the cover to be placed on the visor, and when closed, will retain the cover on the visor.

The front face or panel of the cover is provided with pockets 13 and 14 respectively which are of the same width as the cover, and less than half the length thereof. The pockets are formed of outer panels which are secured to the cover at their top, bottom and rear edges, so that their front edges are free for access to the pockets. Horizontal rows of stitching 15 divide the pockets into upper and lower compartments or smaller pockets for sunglasses, pencils, pens or finger nail files, cigarettes, matches or combs or other similar articles as desired. A strip of elastic material 16 secured across the front edges of the pockets 13 will, by its nature, retain the front edges of the pockets closed. These horizontally disposed pockets provide perfect protection for any articles placed therein, and prevent these articles from falling from the pockets regardless of vibration caused by road conditions or similar vibration creating conditions.

Secured to the rear panel of the cover are outer panels forming pockets 17 and 18 respectively, which are of half the size of the cover 10, and stitching 19 closes the top, bottom and rear edges of these pockets. The front edges 20 form elongated pockets accessible thereby, while stitching 21 forms slender pockets 22 accessible through the front edge 20, and these pockets will hold slender articles. Thus the pockets 17 and 18 form a large pocket, and a slender pocket, both accessible through the front edge 20. These large pockets will carry maps or other similar articles.

The cover can be mounted so that either side is convenient to the driver. The covers can be mounted on right and left visors so that different sides are available to the driver or the cover can be formed with pockets on only one side thereof, the formation of the cover conforming to the desires of the users thereof.

The pockets 17 and 18 can open either to the right or left as desired, and the cover can be made of a washable material or of leather or imitations thereof.

There has thus been provided, a cover for a sun visor which will carry any necessary articles within easy reach of the driver of an automobile.

It is believed that the structure and manner of use of the cover will be apparent to those skilled in the art, and it is to be understood that changes in the minor details of construction may be resorted to, provided they fall within the spirit of the invention and the scope of the appended claims.

Having thus described the invention, what is claimed as new and desired to be secured by Letters Patent is:

1. A motor vehicle sun visor cover including a supporting envelope comprising a substantially rectangular-shaped front panel, a rear panel secured to the front panel along two sides and across one end and with the opposite end of the cover open for receiving a sun visor whereby the visor may be enclosed within the cover, spaced fasteners in the panels for closing the open end of the envelope, and outer panels carried by the supporting envelope positioned on the outer surface of the front panel with edges thereof open providing access to pockets formed by the said outer panels, the edges of the outer panels being secured to edges of the visor cover.

2. A motor vehicle sun visor cover including a supporting envelope comprising a substantially rectangular-shaped front panel, a rear panel secured to the front panel along the sides and across one end with the opposite end open for receiving a sun visor whereby the visor may be enclosed within the cover, fastening means in the panels for closing the said open end, outer panels carried by the supporting envelope positioned on the outer surfaces of the panels with edges thereof open to provide pockets on the surfaces of the cover, and means securing the edges of the said outer panels to corresponding edges of the cover.

3. A motor vehicle sun visor cover including a supporting envelope comprising a substantially rectangular-shaped front panel, a rear panel secured to the front panel along two sides and across one end and with the opposite end open for receiving a sun visor whereby the visor may be enclosed within the cover, separable fasteners in the panels for closing the said open end, outer panels carried by the supporting envelope positioned on the outer surface of the front panel with the inner edges thereof open and in spaced relation providing access to pockets formed by said outer panels, the sides and outer ends of said outer panels being secured to corersponding edges of the said visor cover, and outer panels secured at the edges to the said rear panel and substantially covering the surface of said panel, said outer panels on the rear panel having openings therein providing pockets, and said pockets on the sides of the cover adapted to hold combs, mirrors, coin purses, and the like.

JOSEPH M. AXFORD.
MARY S. AXFORD.

REFERENCES CITED

The following references are of record in the file of this patent:

UNITED STATES PATENTS

| Number | Name | Date |
| --- | --- | --- |
| 1,817,706 | Peavy | Aug. 4, 1931 |
| 2,048,105 | Cobbs | July 21, 1936 |
| 2,148,557 | Hook | Feb. 28, 1939 |
| 2,223,532 | Sallop | Dec. 3, 1940 |
| 2,358,983 | Lyndes et al. | Sept. 26, 1944 |
| 2,453,843 | Hanson | Nov. 16, 1948 |